United States Patent
Rantze et al.

(10) Patent No.: US 6,651,177 B1
(45) Date of Patent: Nov. 18, 2003

(54) CIRCUIT AND METHOD OF PROVIDING POWER TO AN EXTERNAL PERIPHERAL

(75) Inventors: Edward G. Rantze, Lawrenceville, GA (US); Jose L. Izaguirre, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/502,201

(22) Filed: Feb. 10, 2000

(51) Int. Cl.[7] .................................................. G06F 1/26
(52) U.S. Cl. ........................................ 713/300; 713/310
(58) Field of Search ............................... 713/300, 310; 710/1, 8

(56) References Cited

U.S. PATENT DOCUMENTS

| | | | |
|---|---|---|---|
| 4,373,117 A | 2/1983 | Pierce ..................... 179/2 DP |
| 4,395,590 A | 7/1983 | Pierce et al. .............. 179/2 DP |
| 4,578,533 A | 3/1986 | Pierce ..................... 179/2 DP |
| 4,607,379 A | 8/1986 | Marshall, Jr. et al. ....... 375/121 |
| 4,866,602 A | 9/1989 | Hall ........................... 364/200 |
| 4,884,287 A | 11/1989 | Jones et al. ................. 375/121 |
| 4,996,453 A | 2/1991 | Zanders et al. ............. 307/475 |
| 5,125,077 A | 6/1992 | Hall ........................... 395/275 |
| 5,157,717 A | 10/1992 | Hitchcock .................... 379/96 |
| 5,397,928 A | 3/1995 | Chan et al. .................. 307/109 |
| 5,402,015 A | 3/1995 | Hammermann .............. 326/75 |
| 5,504,864 A | 4/1996 | Berg ....................... 395/200.01 |
| 5,557,741 A * | 9/1996 | Jones ........................... 714/43 |
| 5,664,123 A | 9/1997 | Lee et al. .................... 395/309 |
| 5,664,204 A | 9/1997 | Wang ..................... 395/750.01 |
| 5,668,419 A * | 9/1997 | Oktay ......................... 307/125 |
| 5,753,982 A * | 5/1998 | Yeh ............................. 307/125 |
| 5,768,386 A | 6/1998 | Yokomoto et al. ............ 380/24 |
| 5,796,965 A * | 8/1998 | Choi et al. .................. 713/340 |
| 5,832,206 A | 11/1998 | De Jesus et al. ............ 395/186 |
| 5,842,975 A | 12/1998 | Illyes et al. ................. 600/300 |
| 5,848,376 A | 12/1998 | Steiner et al. .............. 701/213 |
| 6,098,127 A * | 8/2000 | Kwang ........................ 361/683 |
| 6,250,940 B1 * | 6/2001 | Kung .......................... 439/218 |
| 6,571,181 B1 * | 5/2003 | Rakshani et al. ............. 702/60 |

* cited by examiner

*Primary Examiner*—Thomas Lee
*Assistant Examiner*—Paul Yanchus, III
(74) *Attorney, Agent, or Firm*—Paul W. Martin (57) ABSTRACT

A circuit and method of providing power to an external peripheral which employ a loopback circuit as an indicator to deliver power. The loopback circuit includes first circuit lines which are coupled together and which receive only a first signal from a port in the computer and route the first signal back to the port. The circuit further includes second circuit lines which carry second signals between the port and the peripheral device, and a third circuit line carries power to the peripheral device from the computer. The method includes the step of sending a signal from a port in a computer to a first circuit coupled to the port, receiving the signal by the port from the first circuit, and providing power from the computer to the peripheral device through a second circuit between the port and the peripheral device.

26 Claims, 7 Drawing Sheets

CIRCUIT AND METHOD OF PROVIDING POWER TO AN EXTERNAL PERIPHERAL

BACKGROUND OF THE INVENTION

The present invention relates to communications circuitry and more specifically to a circuit and method of providing power to an external peripheral.

Various circuits are known for providing power from a computer to an external peripheral. These circuits typically deliver power from a port in the computer. They also deliver power over one of the control lines in the circuits. Thus, delivered power is limited.

Therefore, it would be desirable to provide a circuit and method of providing power to an external peripheral which comes directly from a power source in the computer. It would also be desirable to provide additionally circuitry which can sense when power is to be delivered.

SUMMARY OF THE INVENTION

In accordance with the teachings of the present invention, a circuit and method of providing power to an external peripheral are provided.

The circuit includes first circuit lines which are coupled together and which receive only a first signal from a port in the computer and route the first signal back to the port, second circuit lines which carry second signals between the port and the peripheral device, and a third circuit line carries power to the peripheral device from the computer.

The method includes the step of sending a signal from a port in a computer to a first circuit coupled to the port, receiving the signal by the port from the first circuit, and providing power from the computer to the peripheral device through a second circuit between the port and the peripheral device.

It is accordingly an object of the present invention to provide a circuit and method of providing power to an external peripheral.

It is another object of the present invention to provide a circuit and method of providing power from a computer power supply to a peripheral.

It is another object of the present invention to provide a circuit and method of providing power from a computer power supply to a peripheral through a serial connection between the computer and the peripheral.

It is another object of the present invention to eliminate a separate external power supply for a peripheral.

It is another object of the present invention to provide a circuit and method of providing unlimited power from a computer power supply to a peripheral.

It is another object of the present invention to provide a circuit and method of providing power from a computer power supply to a peripheral using a special cable or cable-like device.

It is another object of the present invention to provide additionally circuitry which can sense when power is to be delivered.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1A:
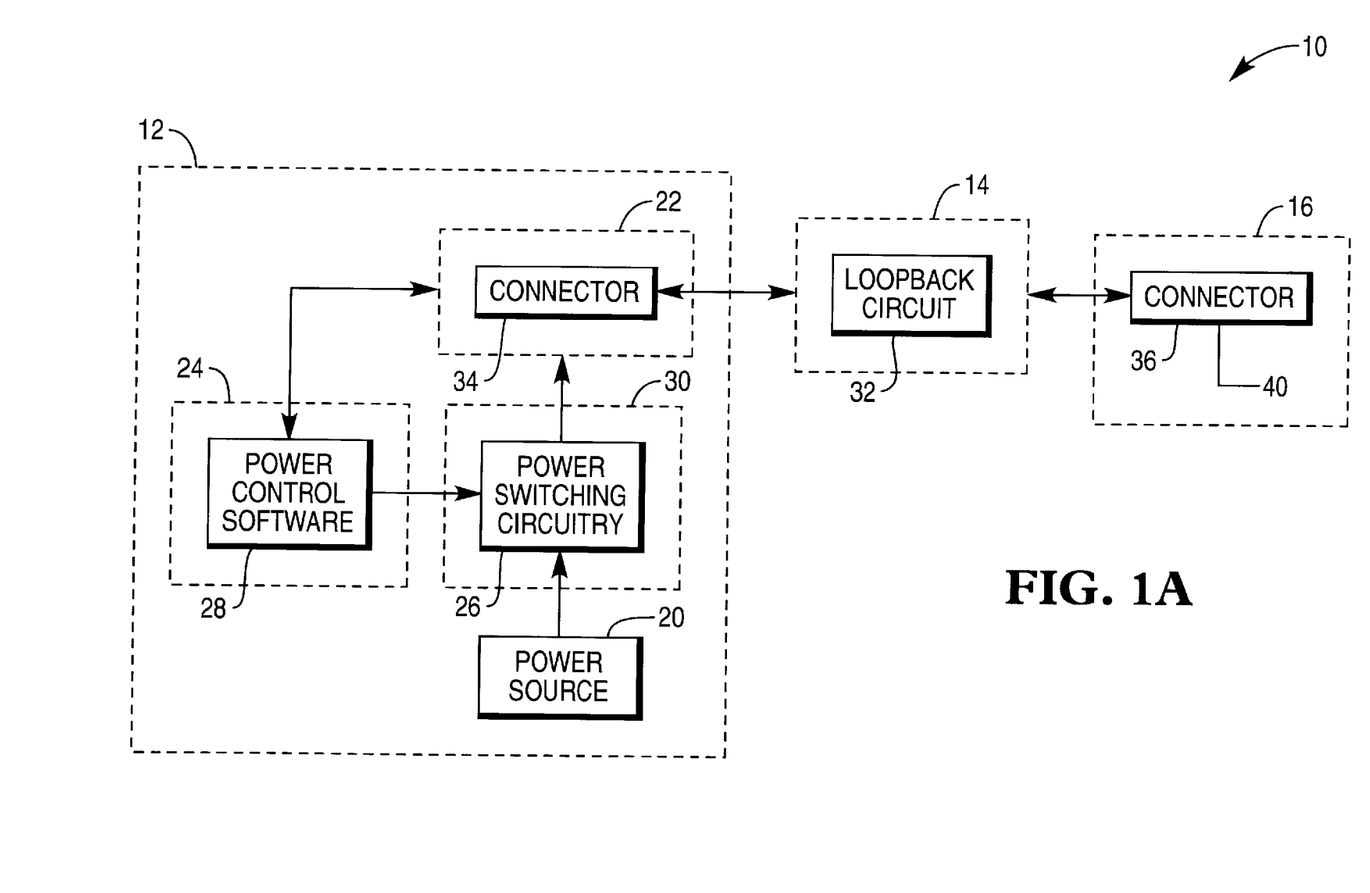
FIG. 1A is a block diagram of a computer system illustrating a first embodiment of the circuit of the present inventions.

Referring to FIG. 1A, system 10 includes computer 12, cable 14, and peripheral device 16.

Computer 12 includes power source 20, serial port 22, processor 24, and power switching circuitry 26.

Power source 20 is preferably an internal power supply which is capable of providing the correct voltage and amperage to peripheral device 16. Since the correct voltage for peripheral device 16 will typically be twelve volts, a typical internal computer power supply will work. Advantageously, no external power supplies are required to provide power to peripheral device 16.

Serial port 22 is a standard serial port and includes a standard connector 34, such as a D-type connector or modular connector. The pin connections and signals are standard and are listed below for a 9-pin serial connector in Table I:

TABLE I

| Pin | Signal |
| --- | --- |
| 1 | DCD |
| 2 | RXD |
| 3 | TXD |
| 4 | DTR |
| 5 | GND |
| 6 | DSR |
| 7 | RTS |
| 8 | CTS |
| 9 | RI |

Processor 24 executes power control software 28, which controls application of power from power source 20 to peripheral device 16. Power control software 28 causes power switching circuitry 26 to apply power to the ring indicate (RI) terminal in connector 34 if it senses that loopback circuit 32 is present. The RI terminal was chosen because peripheral device 16 is of a type which does not use a RI signal. If power control software 28 fails to sense loopback circuit 32, power control software 28 does not enable power through power switching circuitry 26.

Power switching circuitry 26 applies power to the RI terminal of serial port connector 34 in response to a signal from power control software 28.

Power switching circuitry 26 is preferably part of an adapter board 30. Adapter board 30 may additionally include serial port 22.

Cable 14 includes loopback circuit 32. Loopback circuit 32 is part of a special cable 14. In sensing loopback circuit 32, power control software 28 is also sensing the presence of special cable 14. In this way, damage to peripherals, such as modems, which require the RI signal is avoided if such peripherals are ever connected to serial port 22.

Advantageously, serial port 22 is unaffected, except for the power tie-in to the RI pin on connector 34. Thus, a standard serial cable may be connected to serial port 22 instead, if a different peripheral device which uses RI signals must be connected to computer 12.

The advantage associated with this embodiment is that manufacturers of peripheral device 16 can ship special cable 14 and adapter card 30 with such devices 16 and avoid having to ship a power supply. Additional power strips for plugging in peripheral power supplies are not required by users.

As mentioned above, peripheral device 16 is of a type which does not use an RI signal. Examples of this type of peripheral device 16 include bar code readers, signature capture writing pads, remote displays, and some printers. Modems require the RI signal.

Peripheral device 16 also does not require the DCD, DTR, and DSR circuit lines, since they only apply to modems. A DCD signal tells a computer whether a modem is receiving a carrier. The DTR signal tells a modem whether a computer is ready for communication. Finally, a DSR signal tells a computer whether a modem is ready for communication.

Connector 36 is any standard serial connector, such as a D-type connector or modular connector. The pin connections are standard, except that the RI circuit line in connector 36 is tied internally to a power input line 40.

Figure 1B:
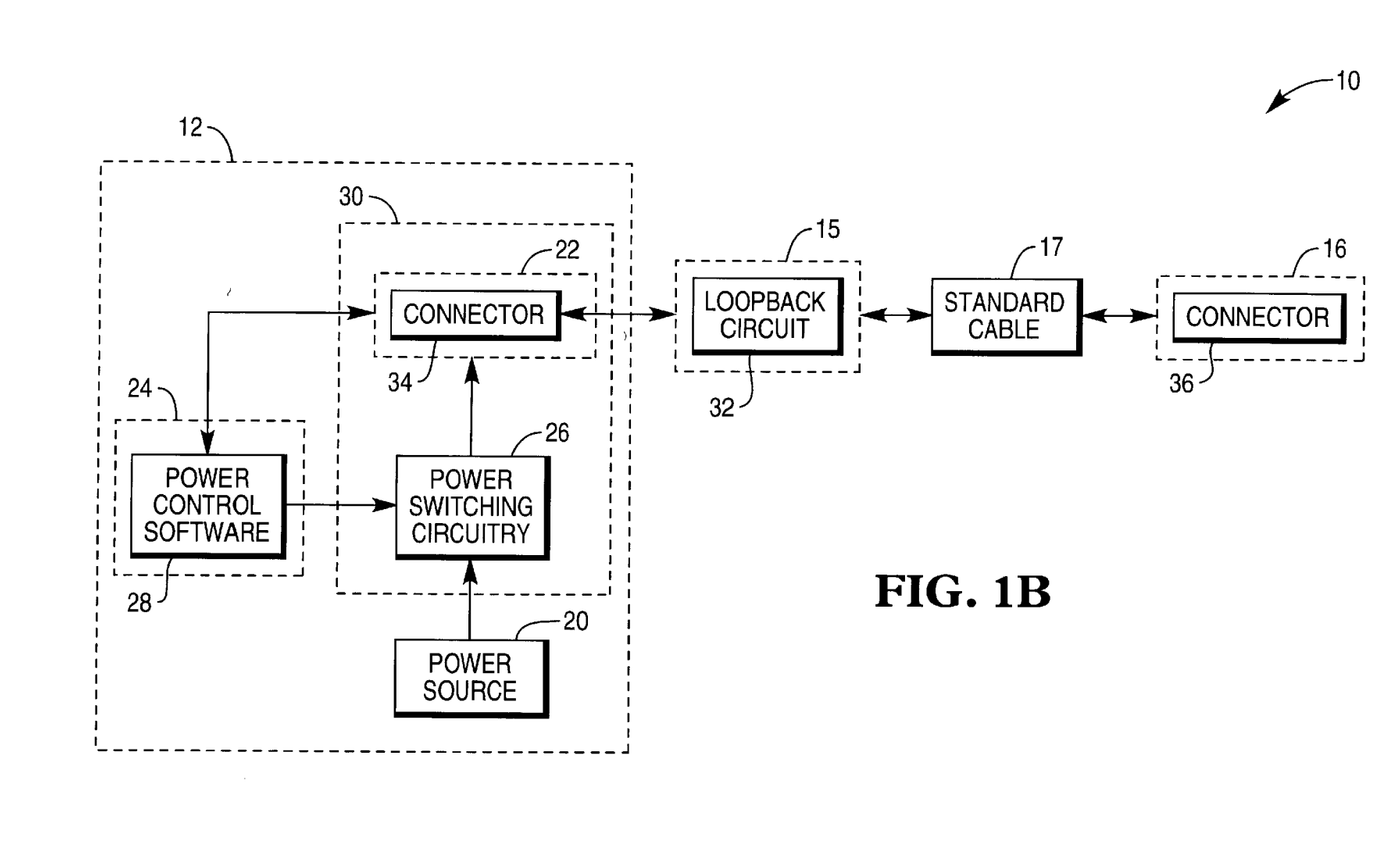
FIG. 1B is a block diagram of a computer system illustrating a second embodiment of the circuit of the present invention.

Referring now to FIG. 1B, system 10 is similar in most respects to the contents of FIG. 1A, except that adapter board 30 includes serial port 22 and cable 14 is replaced by the combination of a separate cable, gender changer, or cable-like device 15 containing loopback circuit 32 and a standard serial cable 17. Power to peripheral device 16 is delivered through cable-like device 15 and cable 17 to connector 36. For this purpose, cable-like device 15 may be connected to either connector 34 or connector 36.

The distinguishable advantage associated with this embodiment over the first embodiment is that manufacturers of peripheral device 16 can ship cable-like device 15 and let the customer purchase standard serial cable 17 to suit distance needs.

Figure 1C:
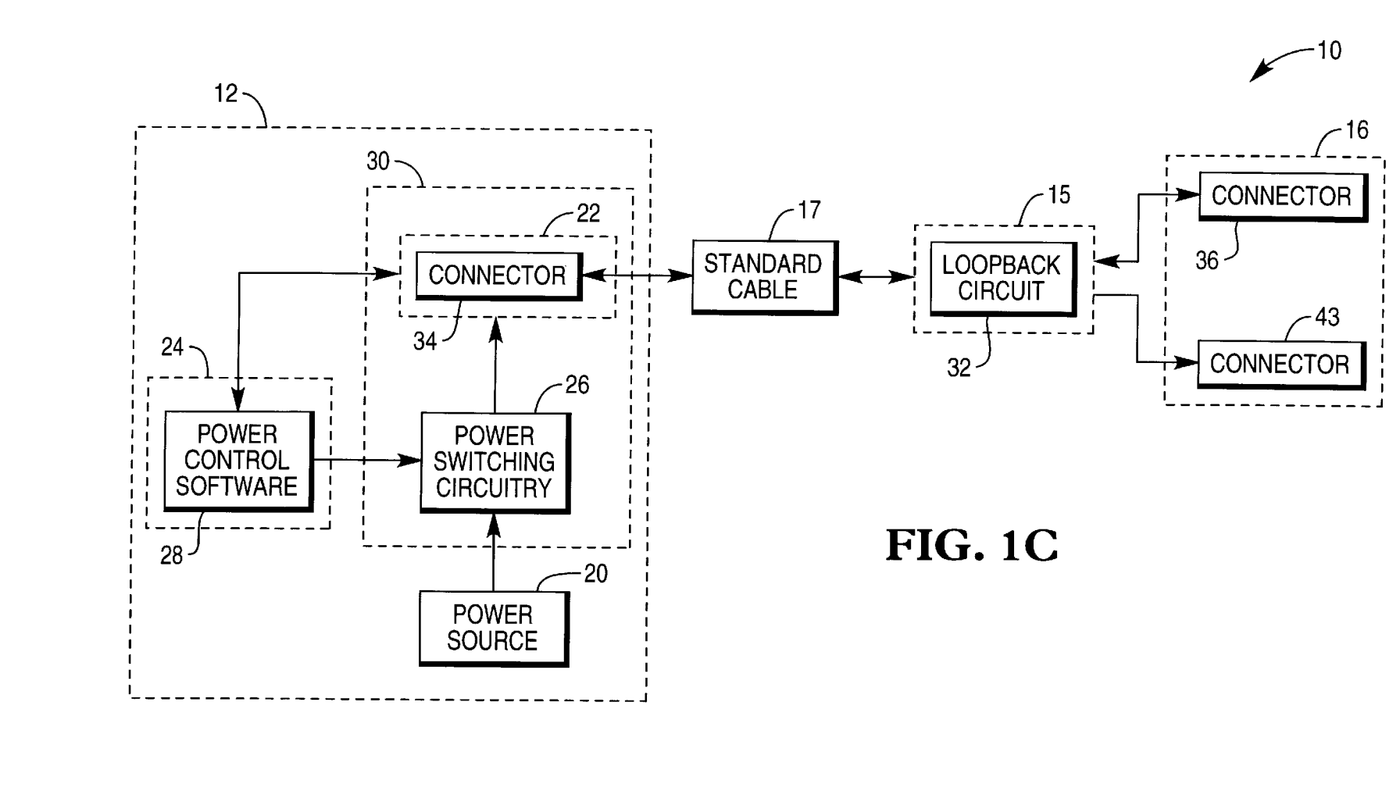
FIG. 1C is a block diagram of a computer system illustrating a third embodiment of the circuit of the present invention.

Referring now to FIG. 1C, system 10 is similar in most respects to the contents of FIG. 1B, except that cable-like device 15 includes an external power connector 41 which connects to power connector 43 of peripheral device 16. Connector 36 does not include a power tap 40. For this purpose, cable-like device 15 is preferably connected to connector 36.

The distinguishable advantage associated with this embodiment over the second embodiment is that manufacturers of peripheral device 16 can ship peripheral device 16 without modification of connector 16.

Figure 2A:
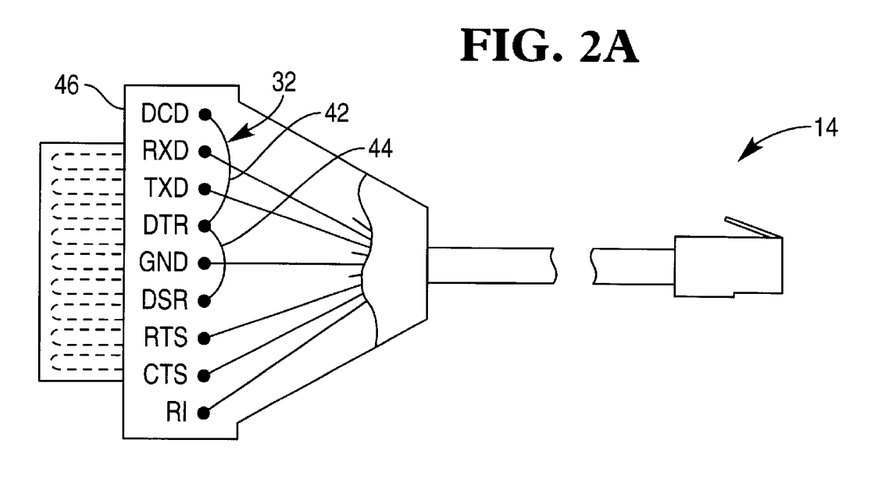
FIG. 2 is a circuit diagram illustrating a loopback circuit of the present invention.

Turning now to FIG. 2A, cable 14 and loopback circuitry 32 are shown in detail.

Loopback circuit 32 connects pins corresponding to the DCD, DTR, and DSR circuit lines together. Loopback circuit 32 includes example circuit lines 42 and 44 for electrically connecting the pins. DCD, DTR, and DSR circuit lines are disconnected and have no function in cable 14.

Cable 14 may be formed from a standard serial cable. As such, connector 46 of cable 14 is preferably a two-part connector, which allows easy access to the solder points of pins of the DCD, DTR, and DSR circuit lines within existing standard serial cables. Circuit lines 42 and 44 may then be easily soldered to the same solder points and the two halves of connector 46 reunited.

Alternatively, cable 14 may be manufactured and specially pre-wired. As such, connector 46 may be a molded connector and circuit connections may be made before halves of connector 46 are fused together.

Figure 2B:
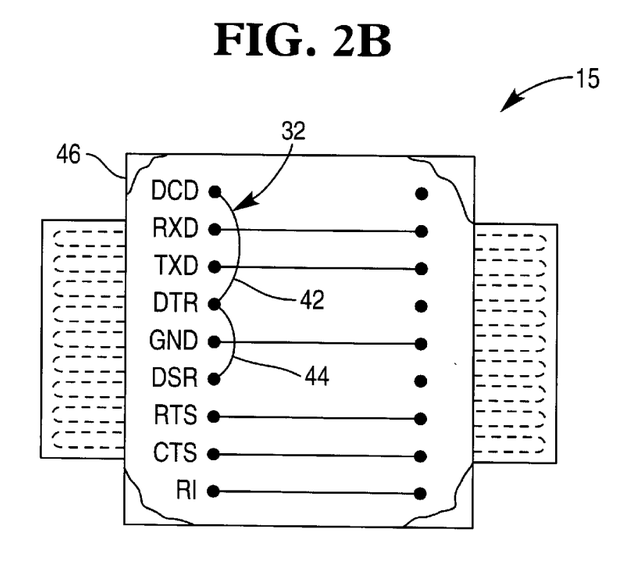

Turning now to FIG. 2B, loopback circuitry 32 may be incorporated into cable-like device 15 using similar wiring techniques. Cable-like device 15 as shown is intended for use with the second embodiment of FIG. 1B.

Figure 2C:
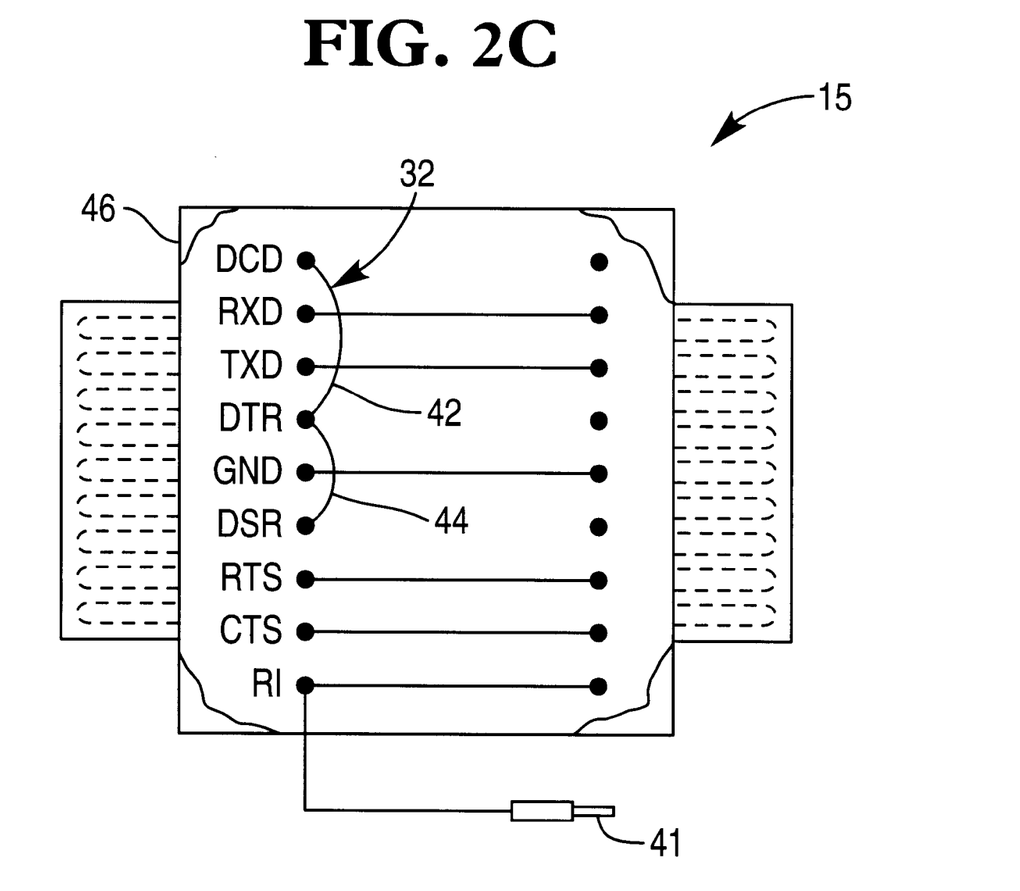

Turning now to FIG. 2C, cable-like device 15 for use with the third embodiment of FIG. 1C is shown.

Figure 3:
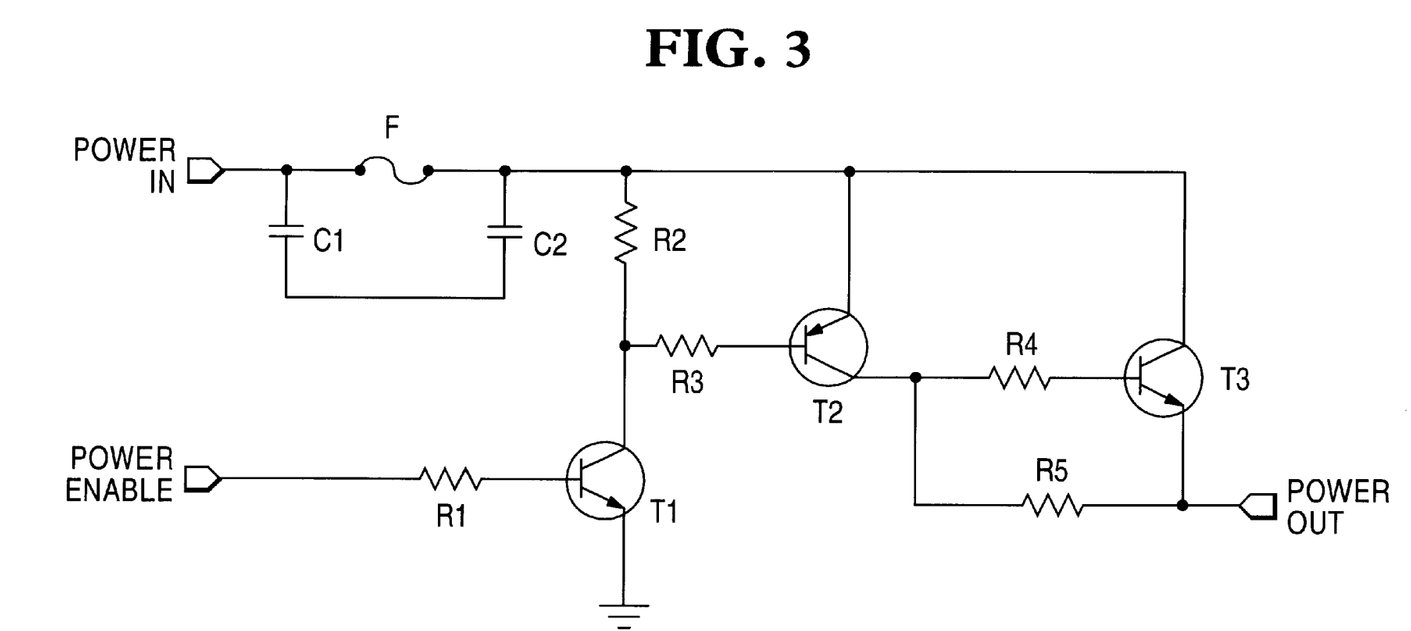
FIG. 3 is a circuit diagram illustrating a power switching circuit of the present invention.

Turning now to FIG. 3, power switching circuitry 26 is shown in detail.

Power switching circuit 26 includes fuse F, capacitors C1 and C2, resistors R1–R5, and transistors T1–T3, whose reference information may be found in Table II below.

TABLE II

| Component | Information |
| --- | --- |
| C1 | 10 mf |
| C2 | .1 mf |
| R1 | 10 kΩ |
| R2 | 10 kΩ |
| R3 | 10 kΩ |
| R4 | 33 Ω |
| R5 | 44.2 kΩ |
| T1 | 2N3904 |
| T2 | 2N3906 |
| T3 | Q MJD47 |

Power control software 28 causes an enable signal to be applied to input POWER ENABLE if it has detected loopback circuit 32. The enable signal turns on transistors T1, T2, and T3, which causes power from input POWER IN to be applied to output POWER OUT. Output POWER OUT is connected to the RI line of connector 34.

If power control software 28 fails to detect loopback circuit 32, then no enable signal is applied at input POWER ENABLE. Transistors T1, T2, and T3 remain off and power from input POWER IN is not applied to output POWER OUT.

Since transistor T3 would otherwise float in the presence of an RI signal, power control switching circuitry includes feedback resistor R5. Resistor R5 provides feedback necessary to allow transistor T3 to remain off as it floats. Transistor T3 remains off through the entire range of RS 232 voltage on the RI line, from −12 v to +12 v. Advantageously, since power comes from power source 20 rather than serial port 22, higher power can be delivered to peripheral device 16 than in previous schemes.

Figure 4:
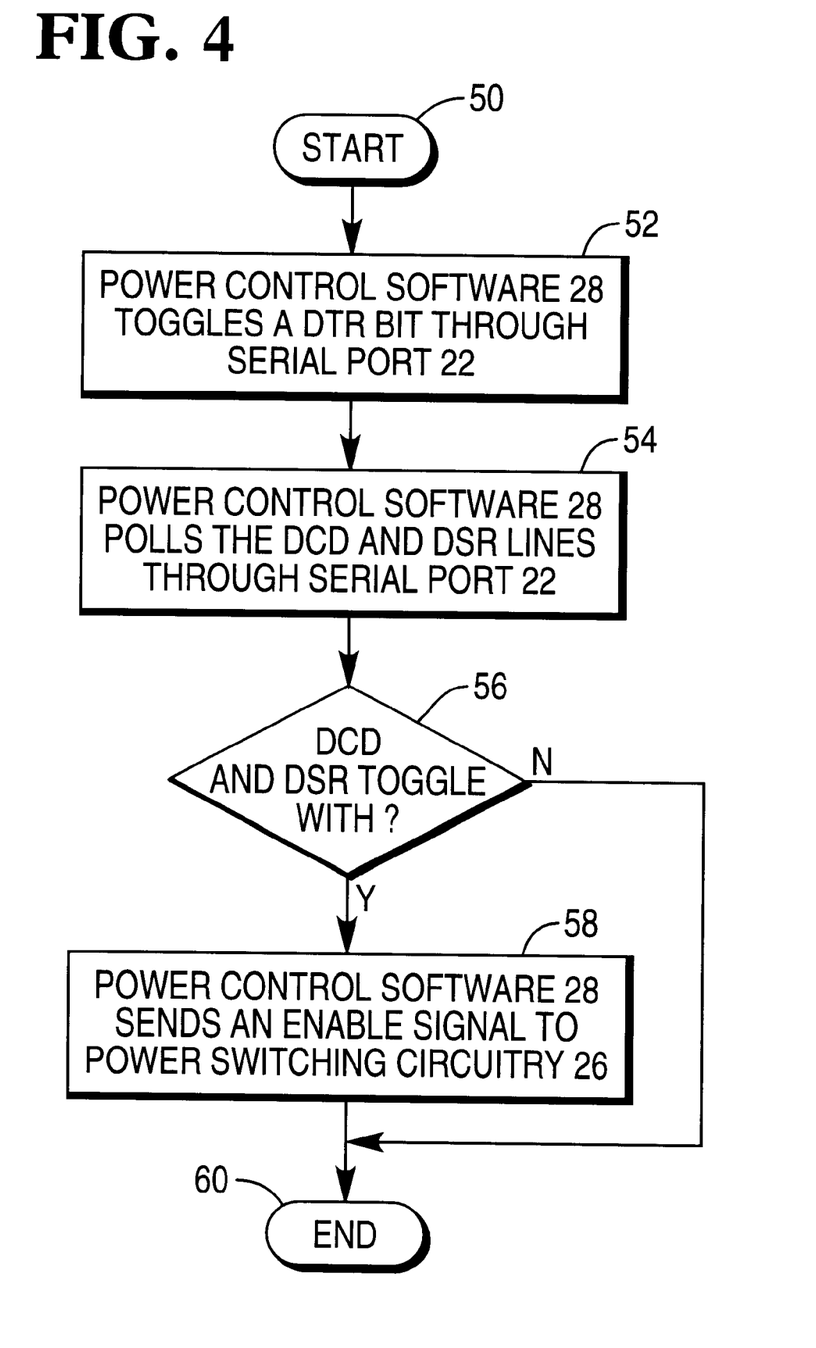
FIG. 4 is a flow diagram illustrating operation of power control software.

Turning now to FIG. 4, operation of power control software 38 is illustrated beginning with START 50.

In step 52, power control software 28 toggles a DTR bit through serial port 22.

In step 54, power control software 28 polls the DCD and DSR lines through serial port 22.

In step 56, power control software 28 determines whether the DCD and DSR lines toggle with the DTR bit. If so, operation proceeds to step 58. If not, operation ends at step 60.

In step 58, power control software 28 sends an enable signal to power switching circuitry 26. In response to the enable signal, power switching circuitry 26 applies power from power source 20 to the RI line.

In step 60, operation ends. If the DCD and DSR lines did not toggle with the DTR bit, then power control software 28 does not apply power to the RI line.

Although the present invention has been described with particular reference to certain preferred embodiments thereof, variations and modifications of the present invention can be effected within the spirit and scope of the following claims.

We claim:

1. A circuit for connecting a computer to a peripheral device comprising:
   a passive loopback circuit including first circuit lines which are coupled together and which receive only a first signal from a port in the computer and route the first signal back to the port;
   second circuit lines which carry second signals between the port and the peripheral device; and
   a third circuit line which carries power from the port of the computer to the peripheral device;
   wherein the first signal signals the computer to supply the power to the third circuit line.

2. A circuit for connecting a computer to a peripheral device comprising:
   a first connector communicatively coupled to a port of the computer;
   a second connector communicatively coupled to the peripheral device;
   a number of circuit lines including
      a passive loopback circuit including first circuit lines which are coupled together and which receive only a first signal from the first connector and route the first signal back to the first connector;
      second circuit lines which carry second signals between the first and second connectors; and
      a third circuit line between the first connector and the second connector which carries power from the port of the computer to the peripheral device;
      wherein the first signal signals the computer to supply the power to the third circuit line.

3. The circuit as recited in claim 2, wherein the first connector is suitable for connection to the port of the computer through a third connector of the port.

4. The circuit as recited in claim 3, wherein the second connector is suitable for connection to a fourth connector of the peripheral device.

5. The circuit as recited in claim 3, wherein the second connector is suitable for connection to a fourth connector of a cable between the circuit and the peripheral device.

6. The circuit as recited in claim 2, wherein the first connector is suitable for connection to the port of the computer through a third connector of a cable between the circuit and the port.

7. The circuit as recited in claim 6, wherein the second connector is suitable for connection to a fourth connector of the peripheral device.

8. A circuit for connecting a computer to a peripheral device comprising:
   a first connector communicatively coupled to a port of the computer;
   a second connector communicatively coupled to the peripheral device;
   a third connector communicatively coupled to the peripheral device;
   a number of circuit lines including
      a passive loopback circuit including first circuit lines which are coupled together and which receive only a first signal from the first connector and route the first signal back to the first connector;
      second circuit lines which carry second signals between the first and second connectors; and
      a third circuit line between the first connector and the second connector which carries power from the port of the computer to the peripheral device;
      wherein the first signal signals the computer to supply the power to the third circuit line.

9. The circuit as recited in claim 8, wherein the third connector is suitable for connection to a fourth connector of the peripheral device.

10. The circuit as recited in claim 8, wherein the first connector is suitable for connection to the port of the computer through a fourth connector of the port.

11. The circuit as recited in claim 9, wherein the second connector is suitable for connection to a fifth connector of a cable between the circuit and the peripheral device.

12. The circuit as recited in claim 8, wherein the second connector is suitable for connection to a fourth connector of the peripheral device.

13. The circuit as recited in claim 12, wherein the first connector is suitable for connection to the port of the computer through a fifth connector of cable between the circuit and the port.

14. A circuit for connecting a computer to a peripheral device comprising:
   a first circuit element including
      a first connector;
      a second connector;
      a number of circuit lines including
         a passive loopback circuit including first circuit lines which are coupled together and which receive only a first signal from the first connector and route the first signal back to the first connector;
         second circuit lines which carry second signals between the first and second connectors; and
         a third circuit line between the first connector and the second connector which carries power from the port of the computer to the peripheral device;
         wherein the first signal signals the computer to supply the power to the third circuit line; and
   a second circuit element including a cable containing fourth circuit lines coupled to the second circuit lines and a fifth circuit line coupled to the third circuit line.

15. The circuit as recited in claim 14, wherein the first circuit element is coupled to a port of the computer and the second circuit element is coupled between the first circuit element and the peripheral device.

16. The circuit as recited in claim 14, wherein the second circuit element is coupled to a port of the computer and the first circuit element is coupled between the second circuit element and the peripheral device.

17. A circuit for connecting a computer to a peripheral device comprising:
   a first circuit element including
      a first connector;
      a second connector;
      a third connector;
      a number of circuit lines including
         a passive loopback circuit including first circuit lines which are coupled together and which receive only a first signal from the first connector and route the first signal back to the first connector;

second circuit lines which carry second signals between the first and second connectors; and a third circuit line between the first connector and the second connector which carries power from the port of the computer to the peripheral device;

wherein the first signal signals the computer to supply the power to the third circuit line; and a second circuit element including a cable containing fourth circuit lines coupled to the second circuit lines.

18. The circuit as recited in claim 17, wherein the first connector is coupled to a port of the computer and the third connector is coupled to the peripheral device.

19. The circuit as recited in claim 17, wherein the second and third connectors are coupled to the peripheral device.

20. A cable for connecting a computer to a peripheral device comprising:

a first connector capable of being coupled to a third connector of a port of the computer;

a second connector which couples to a fourth connector of the peripheral device a number of circuit lines including a passive loopback circuit including first circuit lines which are coupled together and which carry only a first signal from the port and back to the port through the first connector;

second circuit lines which carry second signals between the port and the peripheral device through the first and second connectors; and a third circuit line between the first connector and the second connector which carries power from the port of the computer to the peripheral device;

wherein the first signal signals the computer to supply the power to the third circuit line.

21. The cable as recited in claim 20, wherein the first circuit lines comprise:

a DTR circuit line which receives the first signal from the port; and a DCD circuit line and a DSR circuit line which deliver the first signal back to the port.

22. The cable as recited in claim 20, wherein the second circuit lines comprise serial circuit lines.

23. The cable as recited in claim 20, wherein the third circuit line comprises an RI circuit line.

24. A system comprising:

a computer including
a housing;
a power supply in the housing;
a port in the housing including a connector;
a power switching circuit in the housing which applies power from the power supply to the connector; and
a processor in the housing;

a peripheral device external to the computer; and a circuit for connecting the computer to the peripheral device including a passive loopback circuit including first circuit lines which are coupled together and which receive only a first signal from the port and route the first signal back to the port;

second circuit lines which carry second signals between the port and the peripheral device; and a third circuit line which carries power from the port of the computer to the peripheral device;

wherein the first signal signals the computer to supply the power to the third circuit line;

wherein the processor sends the signal from the port, polls the port for return of the first signal, and, if the first signal returns, sends a second signal to the power switching circuit to provide power from the power source in the computer to the peripheral device through the third circuit line.

25. A method of providing power to an external peripheral device comprising the steps of:

sending a signal from a port in a computer through a passive loopback circuit coupled to the port;

receiving the signal from the passive loopback circuit by the port in the computer; and providing power from the computer to the peripheral device through another circuit between the port and the peripheral device in response to receipt of the signal.

26. A method of providing power to an external peripheral device comprising the steps of:

sending a first signal from a port in a computer through a passive loopback circuit including first circuit lines which are coupled together and which receive only the first signal from the port and route the first signal back to the port in the computer;

polling the port for return of the first signal;

if the first signal returns;

sending a second signal to a power switching circuit in the computer; and providing power from a power source in the computer to the peripheral device through a second circuit line between the port and the peripheral device by the power switching circuit in response to the second signal.

* * * * *